Dec. 29, 1953     J. P. WHALEN     2,664,176
COOLED DISK BRAKE

Filed Aug. 31, 1949     5 Sheets-Sheet 1

INVENTOR.
John P. Whalen
BY
Bodell & Thompson
ATTORNEYS.

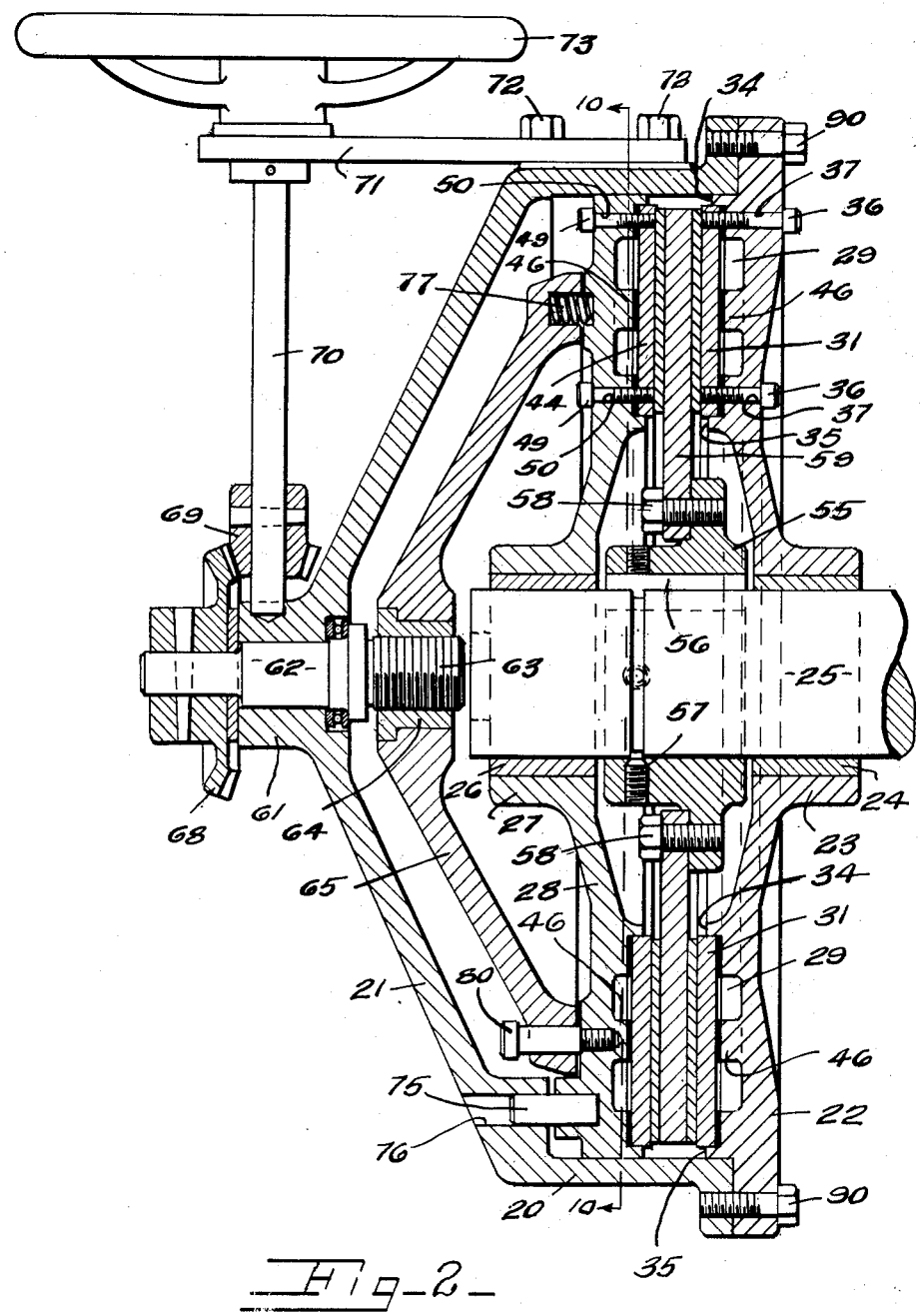

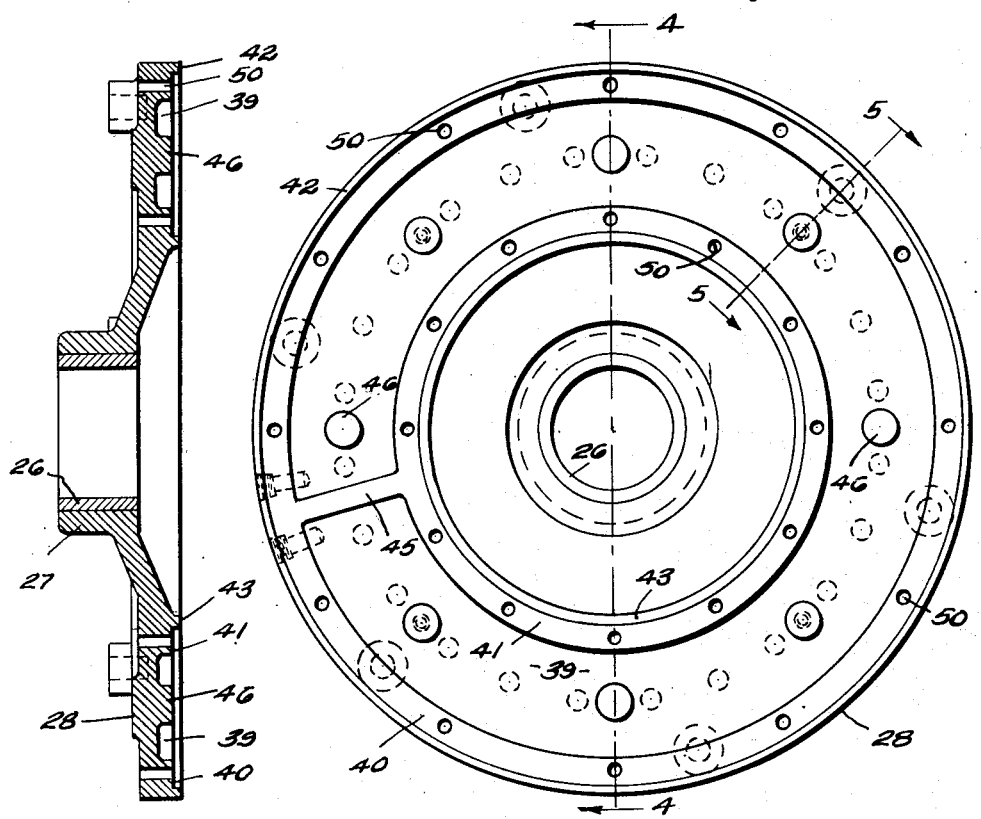
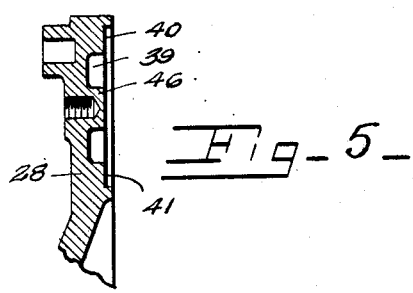

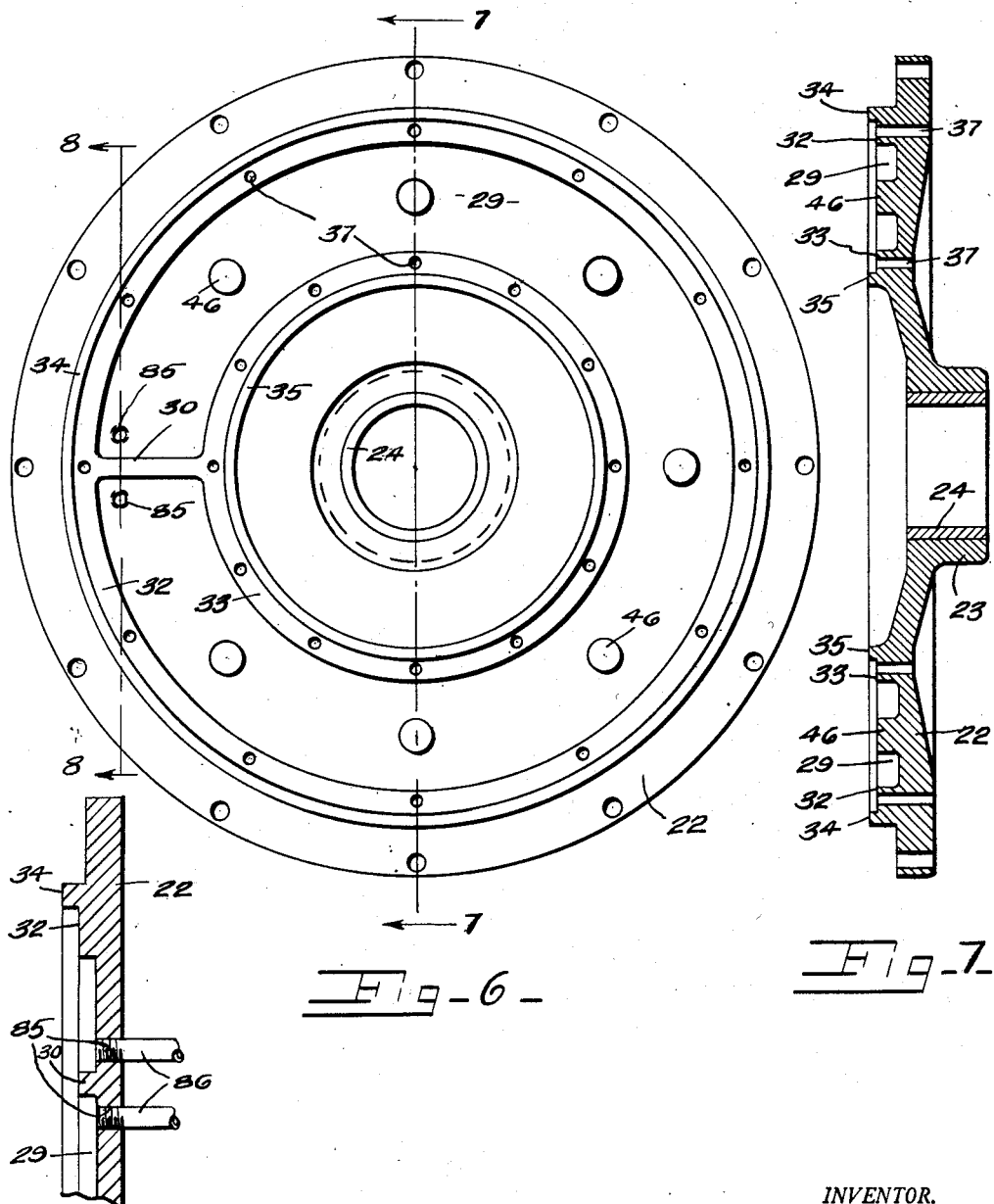

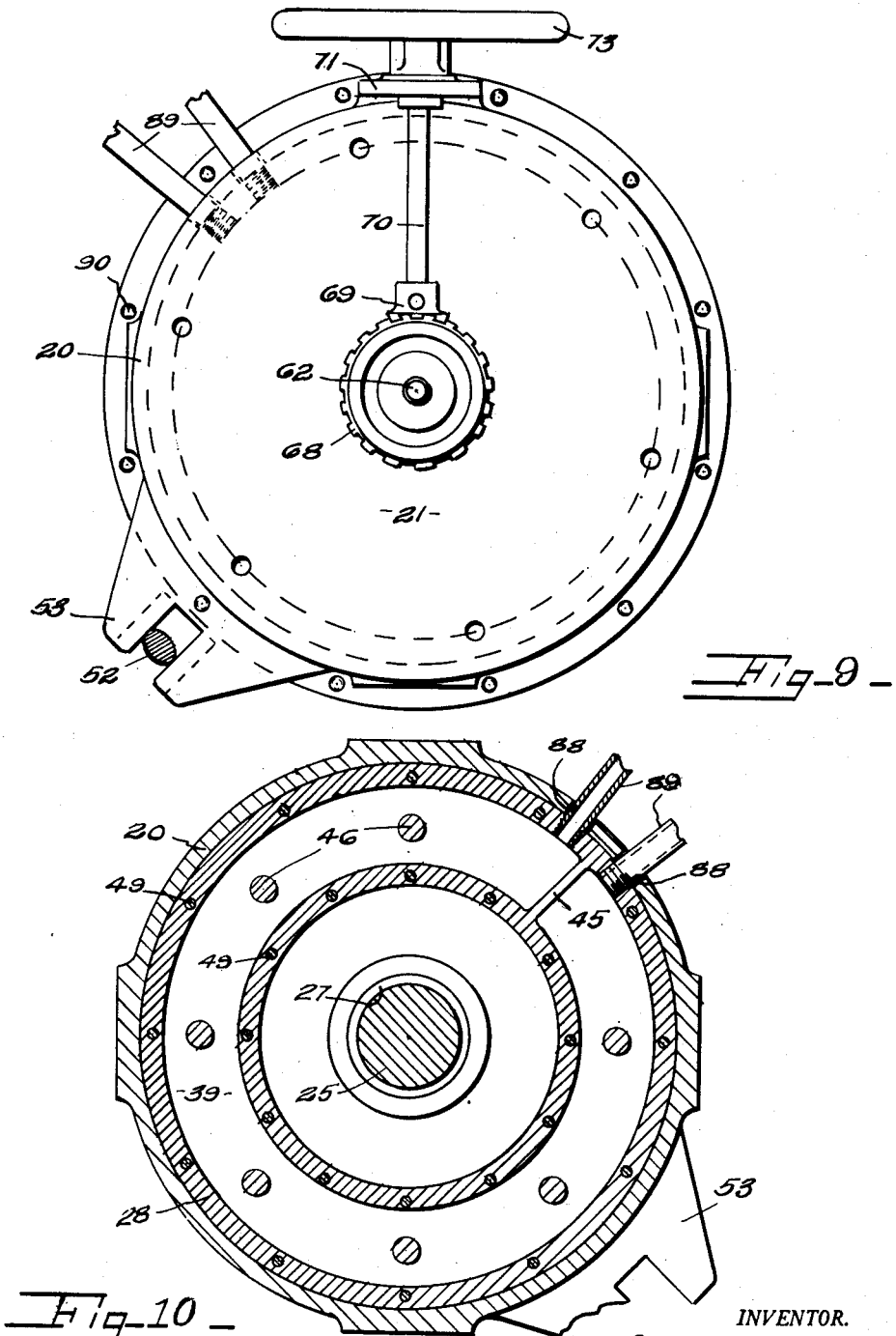

Patented Dec. 29, 1953

2,664,176

UNITED STATES PATENT OFFICE 2,664,176

COOLED DISK BRAKE

John P. Whalen, Watertown, N. Y., assignor to The Bagley & Sewall Company, Watertown, N. Y., a corporation of New York Application August 31, 1949, Serial No. 113,315

3 Claims. (Cl. 188—264)

This invention relates to a structure for retarding the rotation of a shaft. The device is intended particularly as a brake or drag on unwinding reel shafts for paper winders.

It is customary in paper mills to unwind relatively large rolls of paperboard and rewind the same. During this rewinding operation the sheet, which is several feet in width, is generally sliced or cut into narrow sheets and rewound into rolls. These rewinders operate at relatively high speed whereby considerable momentum is built up into the heavy roll of paper, whereby the roll has a tendency to over-run. It is not only desirable to prevent this overrunning, but also to maintain a certain tension or drag on the sheet during the winding operation. Heretofore, various means have been employed to effect such tension or drag. However, they have been unsatisfactory in performance, or have been of complicated, bulky, and costly construction.

This invention has as an object a brake structure of the type referred to embodying a simple construction which can be built at a relatively small cost and which can be conveniently adjusted to effect the desired braking effect or tension on the sheet, and which will function over long periods of operation without overheating.

The invention has as a further object a braking structure embodying an arrangement whereby the complete unit may be quickly and conveniently disassembled, and the friction members replaced, or repaired.

The invention consists in the novel features and in the combinations and constructions hereinafter set forth and claimed.

In describing this invention, reference is had to the accompanying drawings in which like characters designate corresponding parts in all the views.

Figure 2 is a sectional view taken on line 2—2, Figure 1.

Figure 3 is an elevational view of the movable friction member.

Figure 4 is a sectional view taken on line 4—4, Figure 3.

Figure 5 is a partial sectional view taken on line 5—5, Figure 3.

Figure 6 is an elevational view of the inner side of the housing end plate.

Figure 7 is a sectional view taken on line 7—7, Figure 6.

Figure 8 is a partial section taken on line 8—8, Figure 6.

Figure 9 is a front elevational view of the brake structure.

Figure 10 is a view taken on line 10—10, Figure 2.

Figure 1:
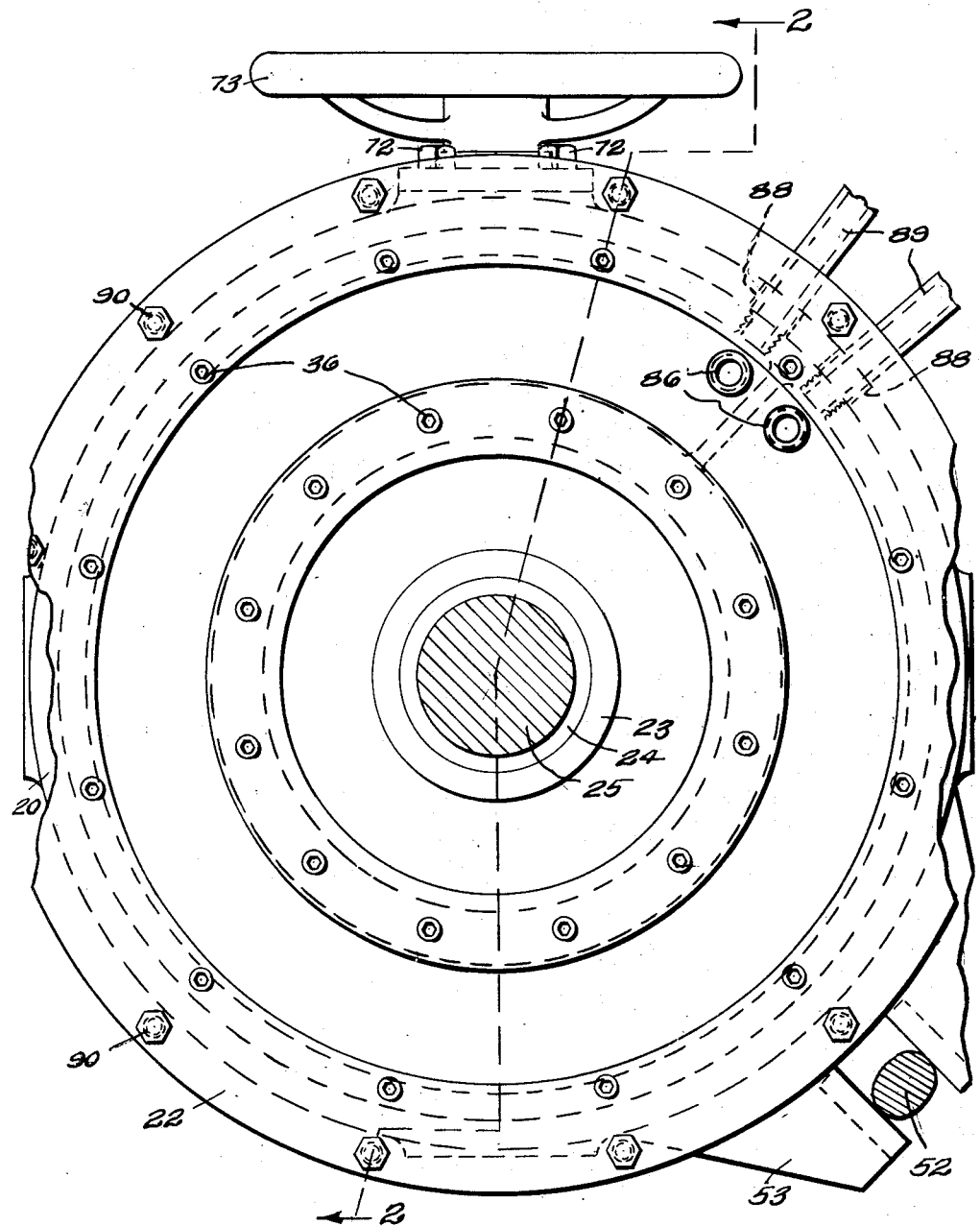
Figure 1 is an end elevational view of a brake structure embodying my invention.

The structure consists of a cylindrical housing 20 having a conical end wall 21. The opposite end of the housing is closed by a circular plate 22 formed with a central hub portion 23 provided with a bearing 24 for the reception of the winder reel shaft 25. The end of the shaft 25 extends into the housing and is also journalled in a bearing 26 mounted in the hub 27 of a plate 28.

The confronting surfaces of the plates 22, 28, are of complemental formation. These surfaces are illustrated in Figures 3 and 7 of the drawings respectively. The end plate 22 is formed with an annular recess 29 which is divided by a radially extending partition 30. An annular member 31 is positioned on the margins 32, 33, of the recess 29 and is located concentrically of the shaft 25 by flanges 34, 35, and is detachably secured to the plate by a plurality of screws 36 extending through apertures 37 formed in the plate and threading into the member 31. The friction wear member 31 thus forms the outer wall converting the recess 29 into an annular passageway extending from each side of the rib 30.

The plate 28 is formed with a similar recess 39, marginal surfaces 40, 41, and flanges 42, 43, for reception of an annular wear piece 44. The plate 28 likewise has a partition rib 45. The plates 22, 28, are formed with circumferentially spaced apart pads 46 terminating in the same plane as the marginal surfaces 32, 33, 40 and 41, the pads serving to back up the central portion of the wear pieces 31, 44. The wear piece 44 is detachably secured to the plate 28 as by screws 49 extending through holes 50 formed in the plate and threading into the wear piece. Both the plates 22, 23, are freely mounted upon the end of the shaft 25 to permit free rotation of the shaft and axial movement of the housing. The housing is restrained from rotation by a bar 52 extending laterally from the frame of the winding machine, the housing being formed with a radially extending bifurcated arm 53 for the reception of the bar 52.

A hub 55 is fixedly secured to the shaft 25 by means of a driving key 56, and a set screw 57. The hub 55 has detachably secured to it, as by screws 58, a disk 59, the disk being positioned intermediate the friction members, as disclosed in Figure 2.

The plate 28 is movable toward and from the end plate 22 by means operable exteriorly of the housing. The end wall 21 of the housing is formed with a hub portion 61 in which is journalled a stub shaft 62, the inner end 63 of which has threaded engagement with a nut 64 mounted in a conical shaped plate 65. The outer end of the shaft 62 is provided with a miter gear 68 arranged in mesh with a pinion 69 secured to the inner end of a shaft 70, the upper end of which is journalled in a bracket 71 extending forwardly from the housing and being secured thereto as by cap screws 72. The upper end of the shaft 70 is provided with a relatively large hand wheel 73, rotation of which effects axial movement of the plate 65 toward and from the plate 22.

The plate 28 is slidably mounted in the housing and restrained from rotation relatively thereto by a plurality of dowel pins 75 mounted in the plate 28 and being slidably mounted in apertures 76 formed in the end wall 21 of the housing. The plates 65 and 28 are formed with alined apertures to receive helical compression springs 77, these springs and the pins 75 being spaced circumferentially apart, and the apertures in the plate 28 being formed in register with certain of the pads 46. The plates 28, 65, are maintained with the spring apertures in alinement by means of shouldered screws 80 threaded into the plate 28 and slidably mounted in the plate 65.

With this arrangement, the plate 65 can be moved inwardly, forcing the wear member 44 carried by the plate 28 into engagement with the disk 39, and also effecting movement of the wear member 31 against the opposite side of the disk due to the floating mounting of the housing on the shaft 25, the pressure with which the members 31, 44, frictionally engage the disk 39 depending upon the position of the plate 65 which is adjustable by means of the hand wheel 73, as above explained. It will be apparent that the plate 65 may be adjusted to vary the frictional engagement of the brake members by means other than the specific structure referred to. For example, the plate 65 may be actuated by a fluid operated piston and cylinder acting between the plate 65 and the housing end portion 21.

It requires several minutes to rewind a large roll of paper. Accordingly, the heat generated by any great mechanism is considerable over this substantial period of time. I have provided means for dissipating this heat and thereby maintaining the disk 39 and the members 31, 44, at a temperature sufficiently low to prevent any warping or other damage to these members which would result from excessive heat. The end plate 22 is provided with threaded apertures 85 located adjacent to and on opposite sides of the dividing rib 30 to receive nipples 86, one of which is connected to a supply of water, or other coolant. With this arrangement, the coolant flows through the passage formed by the recess 29 and in direct contact with the friction member 31. The housing 20 is formed with enlarged openings 88, and these openings are also elongated axially of the shaft 25.

The periphery of the plate 28 is provided with threaded apertures to receive nipples 89, these apertures being likewise spaced in proximity and at each side of the dividing rib 45. One of the nipples 89 is likewise connected to the coolant source, whereby the coolant is circulated through the passage formed by the recess 39 in plate 28, and in direct contact with the friction member 44. This structure is effective to cool both of the friction members.

Attention is called to the fact that while the brake structure is exceedingly compact, it consists of relatively few simple parts which are economical to manufacture. Also, in the event the disk 39, or the friction members 31, 44, need replacing, the brake structure can be readily disassembled for such purpose. By simply removing the cap screws 90, disconnecting the end plate 22, the housing and all of the other parts may be removed from the end of the shaft as a unit, whereupon the disk 39 can be readily removed from the shaft and reground or replaced, although this structure has operated on winding machines over a long period of time without requiring any maintenance due to the rigid, compact arrangement and the fact that the heat generated, during the braking operation, is completely dissipated.

What I claim is:

1. A shaft brake comprising an enclosed housing, a shaft journalled in one end wall of the housing, a carrier arranged in the housing and being journalled on the inner end of said shaft and being movable axially thereof toward and from said end wall, said carrier and housing having means cooperable to restrain rotation of the carrier relative to the housing, the confronting surfaces of said end wall and carrier being formed with annular channels for the circulation of a cooling medium, annular friction members detachably secured to the confronting surface of said end wall and said carrier respectively in registration with said channels and forming a closure therefor, a friction disk fixedly secured on the shaft intermediate said end wall and said carrier and extending between said annular friction members, and means operable externally of the housing to move said carrier toward said end wall.

2. A shaft brake comprising a non-rotatable enclosed housing open at one end, a plate member detachably secured to the housing and forming an end wall closure for the open end of the housing, a shaft journalled in said plate and extending into the housing, a carrier journalled on the inner end of the shaft and having means cooperable with the housing to restrain rotation of the carrier relative to the housing, said housing having limited axial movement on said shaft and said carrier being independently movable axially of the shaft toward and from said end plate, the confronting surfaces of said end plate and said carrier being formed with annular channels, annular friction members detachably secured to the confronting surface of said end plate and the confronting surface of said carrier respectively and forming closures for said channels, means for circulating a cooling medium in said channels in contact with said friction members, means mounted in the opposite end wall of said housing in axial registration with said shaft and operable externally of the housing to effect axial movement of said carrier toward said end plate, and a friction disk fixedly secured to the shaft and being positioned for rotation between said friction members.

3. A shaft brake comprising an enclosed housing, a shaft journalled in one end wall of the housing, a carrier arranged in the housing and being journalled on the inner end of said shaft and being movable axially thereof toward and from said end wall, said carrier and housing having means cooperable to restrain rotation of the carrier relative to the housing, the confronting surfaces of said end wall and carrier being formed with annular channels for the circulation of the cooling medium, annular friction members detachably secured to the confronting surface of said end wall and said carrier respectively in registration with said channels and forming a closure therefor, a friction disk keyed on the shaft intermediate said end wall and said carrier and extending between said annular friction members, a shaft mounted in the other end wall of the housing in axial registration with said first shaft, a pressure plate mounted on the inner end of said second shaft and being operatively connected at its periphery to said carrier, means operable exteriorly of the housing for actuating said shaft, said shaft being operable upon actuation to effect movement of said pressure plate and said carrier toward and from said first mentioned end wall.

JOHN P. WHALEN.

References Cited in the file of this patent

UNITED STATES PATENTS

| Number | Name | Date |
|---|---|---|
| 1,268,334 | Everett | June 4, 1918 |
| 1,743,409 | Tracy | Jan. 14, 1930 |
| 2,051,286 | Boykin | Aug. 18, 1936 |
| 2,082,633 | Johnstone | June 1, 1937 |
| 2,127,557 | Ells | Aug. 23, 1938 |
| 2,498,123 | Hobbs | Feb. 21, 1950 |

FOREIGN PATENTS

| Number | Country | Date |
|---|---|---|
| 32196/545 | Switzerland | Mar. 17, 1905 |